(12) United States Patent  
Johnston et al.

(10) Patent No.: US 9,193,607 B1
(45) Date of Patent: Nov. 24, 2015

(54) WATER TREATMENT FOR HIGH-EFFICIENCY CLEANING

(71) Applicant: Maxia Investments, LLC, Kingsport, TN (US)

(72) Inventors: Allen M. Johnston, Johnson City, TN (US); Gary E. Endres, Gray, TN (US)

(73) Assignee: Maxia Investments, LLC, Kingsport, TN (US)

( * ) Notice: Subject to any disclaimer, the term of this patent is extended or adjusted under 35 U.S.C. 154(b) by 0 days.

(21) Appl. No.: 14/624,421

(22) Filed: Feb. 17, 2015

(51) Int. Cl.
C02F 1/78 (2006.01)
C02F 1/00 (2006.01)
A47L 15/42 (2006.01)
B01F 3/04 (2006.01)
B01F 5/04 (2006.01)

(52) U.S. Cl.
CPC ............... C02F 1/008 (2013.01); A47L 15/424 (2013.01); C02F 1/78 (2013.01); B01F 5/0428 (2013.01); B01F 2003/04886 (2013.01); C02F 2201/782 (2013.01); C02F 2201/784 (2013.01); C02F 2209/40 (2013.01); C02F 2305/02 (2013.01); C02F 2307/12 (2013.01)

(58) Field of Classification Search
CPC ..................................................... A47L 15/424
See application file for complete search history.

(56) References Cited

U.S. PATENT DOCUMENTS 1,498,839 A * 6/1924 Hartman .................... 261/114.1
5,765,403 A   6/1998 Lincoln et al.
5,790,934 A   8/1998 Say et al.
5,929,324 A   7/1999 Hu et al.
5,939,030 A   8/1999 Moxley et al.
6,287,431 B1  9/2001 Murphy et al.
6,303,085 B1  10/2001 Kwak et al.
6,461,520 B1 * 10/2002 Engelhard et al. ....... 210/748.12

(Continued)

FOREIGN PATENT DOCUMENTS

CN    1222882     9/2009
CN    1490321     10/2009
CN    201534791   7/2010

OTHER PUBLICATIONS

Internet webpage http://pureproductsinternational.com/index.php/shop.html offering prior "pureWash" product for sale in two separate models: "High Efficiency Low Flow" and "Standard Efficiency High Flow" (retrieved from Internet Feb. 26, 2015; effective date unknown, but admitted as prior art).

*Primary Examiner* — Terry Cecil
(74) *Attorney, Agent, or Firm* — Luedeka Neely Group, P.C.

(57) ABSTRACT

Water treatment apparatus for supplying ozonated water to appliances, such as clothes washing machines. First and second water aspirators include respective first and second Venturi tubes. One aspirator is designed for a relatively higher water flow rate, and the other is designed for a relatively lower water flow rate. A valve selectively directs water from a water inlet to a water outlet through either the first or the second water aspirator. Ozone from an ozone generator is drawn either into water flowing through the first Venturi tube or water flowing through the second Venturi tube, depending on the position of the valve. A water flow sensor includes a microphone physically connected for sensing a sound characteristic of operation of a Venturi tube. A controller effects a time delay for maintaining activation of the ozone generator for a predetermined time duration even after water flow has ceased.

6 Claims, 8 Drawing Sheets

(56) References Cited

U.S. PATENT DOCUMENTS

| | | |
|---|---|---|
| 6,596,092 B1 | 7/2003 | Satoh et al. |
| 6,607,672 B2 | 8/2003 | Koslow et al. |
| 6,881,331 B1 * | 4/2005 | Barnes .................... 210/192 |
| 2002/0088061 A1 | 7/2002 | Kown |
| 2003/0080068 A1 | 5/2003 | Koslow et al. |
| 2005/0072195 A1 | 4/2005 | McEachern |
| 2013/0146516 A1 * | 6/2013 | Chen et al. .................... 210/143 |
| 2013/0306569 A1 * | 11/2013 | Johnston .................... 210/739 |

* cited by examiner

# WATER TREATMENT FOR HIGH-EFFICIENCY CLEANING

BACKGROUND OF THE INVENTION

Disclosed herein is an improvement of the embodiments described in Johnston U.S. patent application Ser. No. 13/898,095, filed May 20, 2013, and published as Pub. No. US 2013/0306569 on Nov. 21, 2013, the entire disclosure of which is hereby expressly incorporated by reference.

The invention relates to the treatment of water with ozone for supply to appliances, particularly clothes washing machines.

Ozone (chemical formula $O_3$) is well known as a powerful oxidant. A number of methods are known for producing ozone. Corona discharge is a common method, and is employed in embodiments of the invention disclosed herein. Another common method for generating ozone generator employs an ultraviolet light (UV). Other methods for generating ozone are a cold plasma method, and electrolytic ozone generation. Embodiments of the invention, however, are not limited to any particular type of ozone generator. It is also well known that ozone can be dissolved in water, and also can exist as small bubbles in water, both of which are known as ozonated water.

The use of ozonated water in a clothes washing machine has a number of advantages. As examples, the use of detergent can be reduced or eliminated. As a result, expense for detergent is reduced or eliminated, as well as build up of detergent residue. (Related to the reduction or elimination of detergent, the wastewater from a clothes washing machine supplied with ozonated water is considered "green," without high levels of biological oxygen demand (BOD) food for bacteria.) Cold water can be used for clothes washing, providing energy savings from reduced hot water usage. The life of clothing, as well as the life of a washing machine, can be extended.

Ozonated water used in a clothes washing machine can remove irritating chemicals from clothing. This is particularly important for persons with chemical sensitivity.

In addition, ozonated water significantly reduces microbes, including mold, bacteria and viruses.

SUMMARY OF THE INVENTION

In one aspect, water treatment apparatus is provided. The water treatment apparatus has a water inlet and a water outlet, as well as first and a second water aspirators including respective first and second Venturi tubes through which water can flow. Each of the Venturi tubes has a water inlet port, a water outlet port, and a vacuum port. The first Venturi tube is designed for a relatively higher water flow rate and the second Venturi tube is designed for a relatively lower water flow rate. The water treatment apparatus also has a valve with two positions for selectively directing water from the water inlet to the water outlet through either the first or the second water aspirator. An ozone generator has an output connected to the vacuum ports. As a result, gas including ozone is drawn either into water flowing through the first Venturi tube or water flowing through the second Venturi tube, depending on the position of the valve.

In another aspect, water treatment apparatus is provided. The water treatment apparatus has a water inlet and a water outlet, as well as at least one water aspirator including a Venturi tube through which water can flow. The Venturi tube has a water inlet port, a water outlet port, and a vacuum port. An ozone generator has an output connected to the vacuum port. As a result, gas including ozone is drawn into water flowing through the Venturi tube. A water flow sensor includes a microphone physically connected for sensing a sound characteristic of operation of the Venturi tube. The water flow sensor is connected to a controller for activating the ozone generator when water is drawn out of the water outlet and thereby through the at least one water aspirator.

In yet another aspect, water treatment apparatus is provided. The water treatment apparatus has a water inlet and a water outlet, as well as at least one water aspirator including a Venturi tube through which water can flow. The Venturi tube has a water inlet port, a water outlet port, and a vacuum port. An ozone generator has an output connected to the vacuum port. As a result, gas including ozone is drawn into water flowing through the Venturi tube. A water flow sensor is connected to a controller for activating the ozone generator when water is drawn out of the water outlet and thereby through the at least one water aspirator. The controller effects a time delay for maintaining activation of the ozone generator for a predetermined time duration even after water flow as sensed by the water flow sensor has ceased. As a result, the ozone generator operates continuously when water is intermittently drawn out of the water outlet.

DETAILED DESCRIPTION

Figure 1:
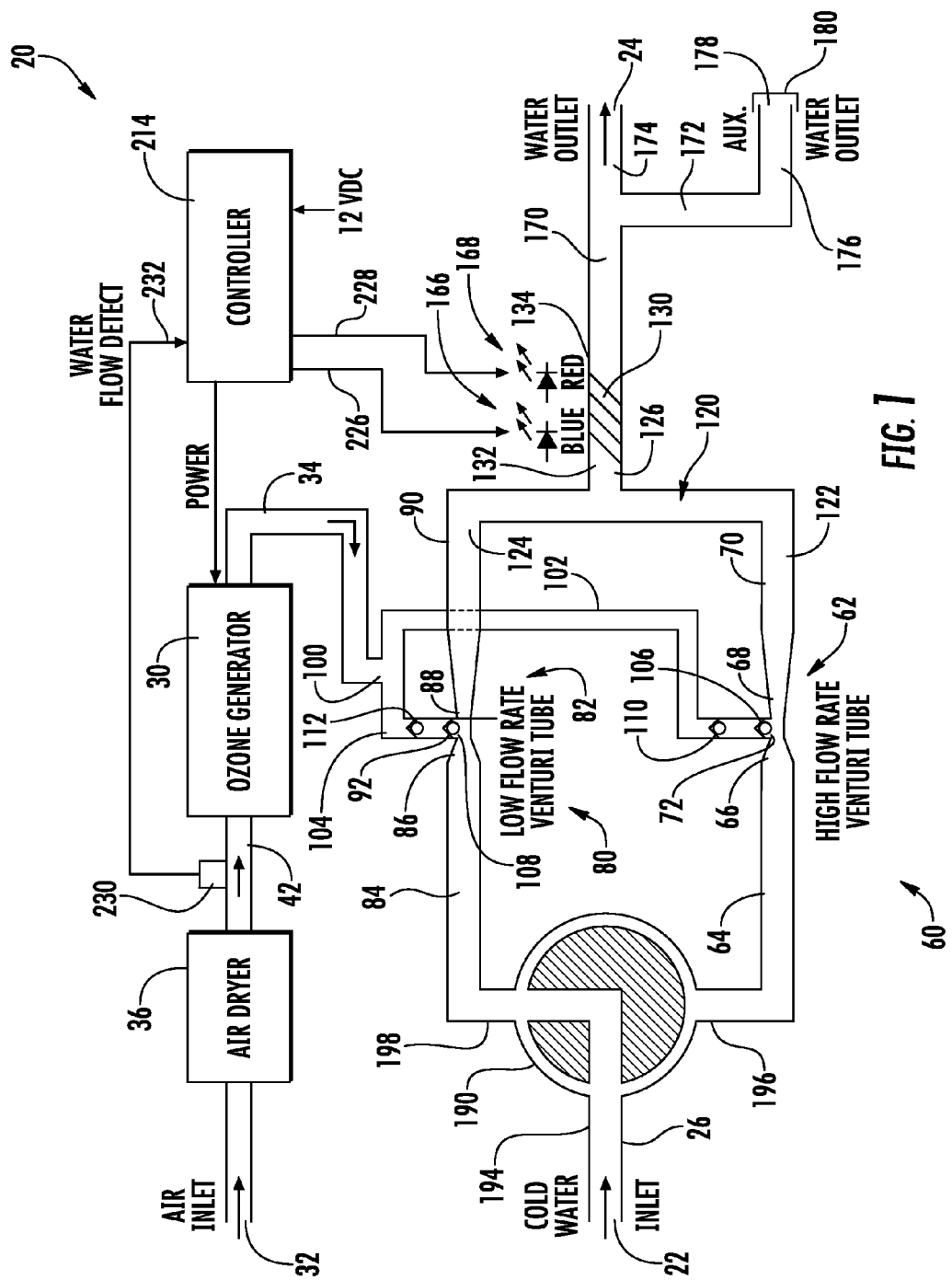
FIG. 1 is a schematic diagram of water treatment apparatus embodying the invention.
Figure 2:
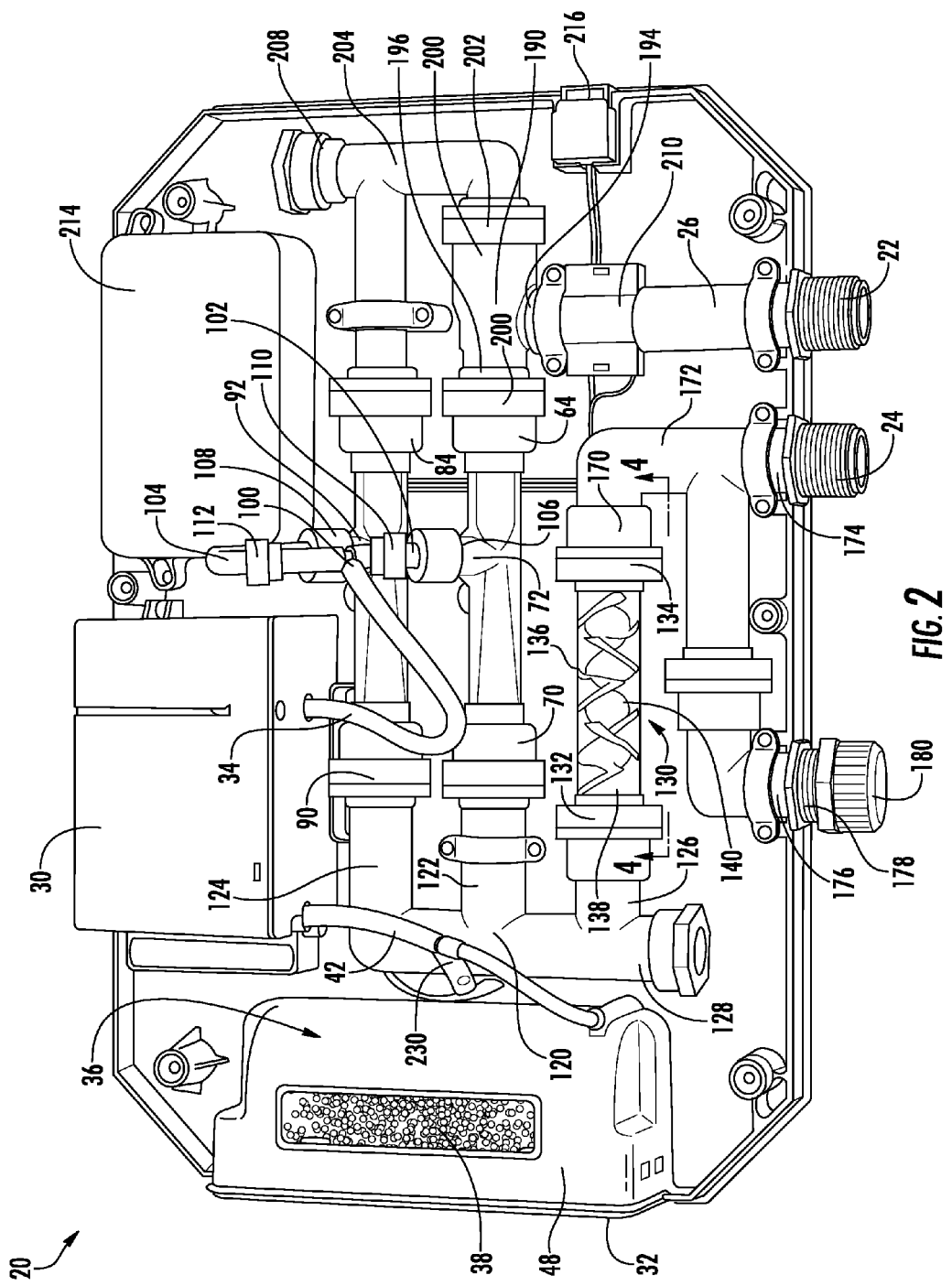
FIG. 2 is a three dimensional view, showing an exemplary mechanical layout within the interior of the water treatment apparatus shown schematically in FIG. 1.

With reference to both the schematic diagram of FIG. 1 and the exemplary mechanical layout of FIG. 2, water treatment apparatus 20 embodying the invention includes a water inlet 22 for connection, as an example, to a domestic cold water supply, as well as a water outlet 24 for connection, as an example, to the cold water inlet of a domestic clothes washing machine. Within the apparatus 20, the water inlet 22 is connected to a water outlet 24. The apparatus 20 functions to ozonate water supplied to the water inlet 22 and delivered at the water outlet 24.

Accordingly, the apparatus 20 additionally includes an ozone generator, generally designated 30, and an air inlet 32, which receives ambient air. Ozone generators are well known. In the particular embodiment disclosed herein, the ozone generator 30 employs corona discharge. Accordingly, the corona discharge ozone generator 30 employs a high voltage power supply (not shown) which generates a voltage applied across glass dielectric plates (not shown) to develop a corona discharge, which then produces ozone from oxygen in the ambient air. Venturi tube vacuum, described in greater detail hereinbelow, draws air from the air inlet 32, across the dielectric plates to produce a gaseous mixture of air and ozone, and then out through an outlet air conduit 34.

Figure 3:
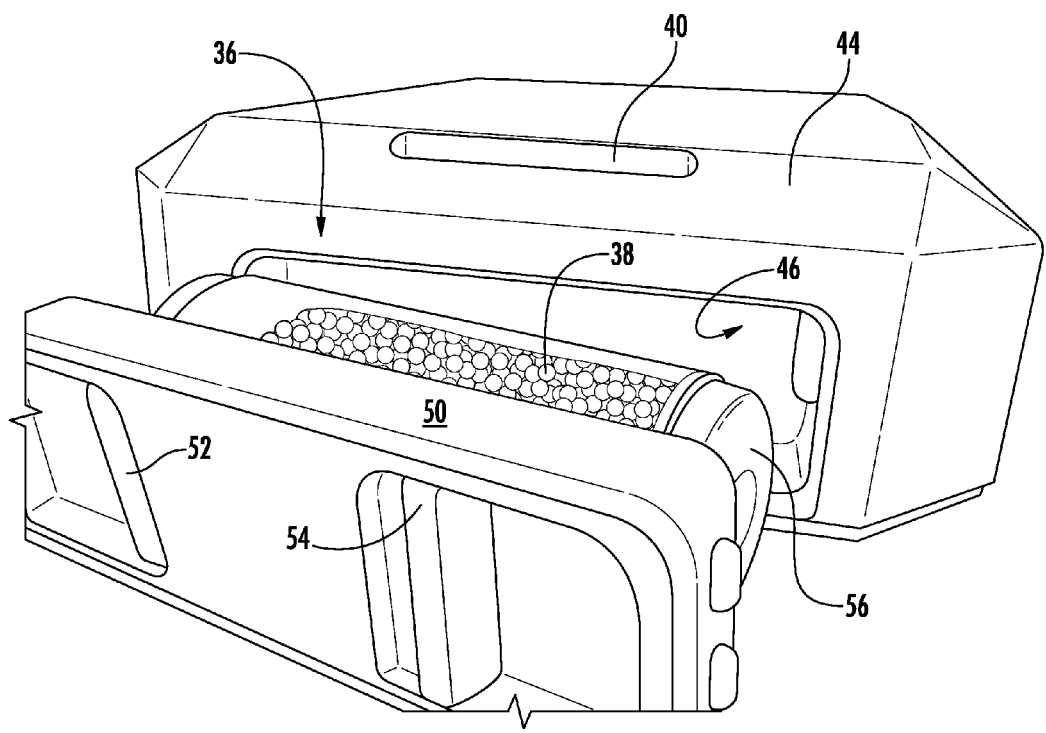
FIG. 3 is a three dimensional left side view of the water treatment apparatus, showing an air dryer employing a desiccant.

Corona discharge ozone generators function better when supplied with relatively drier air. An air dryer generally designated 36 is included. In the disclosed embodiment, the air dryer 36 employs a desiccant 38 including silica gel. The desiccant 38 changes color from blue when new, to pink when the desiccant 38 requires replacement, and is visible through a window 40 (FIG. 3). Relatively dryer air accordingly is supplied from the air dryer 36 to the ozone generator 30 via an inlet air conduit 42.

Referring briefly to FIG. 3, which is a side view of the water treatment apparatus 20 with a top cover 44 in place, the air dryer 36 includes a cavity 46 (FIG. 3) within a cavity body 48 (FIG. 2) which receives a holder 50. The holder 50 has two latch actuators 52 and 54, and supports a removable and replaceable desiccant cartridge 56. The desiccant cartridge 56 contains the actual desiccant 38. The window 40, through which the color of the desiccant 38 is observed, is in the top cover 44.

Relatively dry air exits the desiccant cartridge 56 at the right side in the orientation of FIG. 3, to enter the inlet air conduit 42. Ambient air enters the cavity 46 and then the desiccant cartridge 56 from outside the apparatus through cracks or small openings between the holder 60 and the cavity body 48. The holder 50 thus does not have a tight fit.

Referring again to FIGS. 1 and 2, cold water flows from the water inlet 22 to the water outlet 24 through at least one water aspirator, generally designated 60. The water aspirator 60 includes a conventional Venturi tube 62 which has a water inlet port 64, an inlet cone 66 with a relatively greater angle, an outlet cone 68 with a relatively shallower angle, and a water outlet port 70. As a result of increased water velocity immediately downstream of the inlet cone 66, a vacuum is generated at a vacuum port 72, which is employed to draw a gaseous mixture of air and ozone into water flowing through the aspirator 60.

In the disclosed embodiment, there are two water aspirators, including respective first and second Venturi tubes. Thus, the aspirator 60 and its respective Venturi tube 62 are herein termed the first aspirator 60 and the first Venturi tube 62.

A second water aspirator 80 includes a corresponding Venturi tube 82, likewise having a water inlet port 84, an inlet cone 86 with a relatively greater angle, an outlet cone 88 with a relatively shallower angle, a water outlet port 90, and a vacuum port 92.

The outlet air conduit 34 of the ozone generator 30 branches, at a "Y" connection 100, into two separate conduits 102 and 104. To ensure that water does not flow from the Venturi tubes 62 and 82 back into the ozone generator 30 via the conduits 102 and 104 and the outlet air conduit 34, several check valves are provided. In particular, at the two vacuum ports 72 and 92 are a corresponding pair of primary check valves 106 and 108. In addition, secondary check valves 110 and 112 are provided in the two conduits 102 and 104.

A particular problem addressed by some embodiments of the invention is that different clothes washing machines have different water flow rates when filling. For example, a top load washer may require as much as forty gallons of water per load to fill, and fills at a relatively higher water flow rate. A front load washer requires typically fourteen gallons of water per load to fill, and typically fills at a relatively lower water flow rate. This difference in water fill rates has two consequences. First, a Venturi tube is designed for a particular minimum water flow rate threshold, below which the Venturi tube loses effect and essentially does not function. As a result, a Venturi tube designed for a top load washer with a relatively higher water fill rate may not function at all with a front load washer which draws water at a relatively lower fill rate. Second, if a Venturi tube is designed for the relatively lower fill rate of a front load washer, the Venturi tube does function at the relatively higher fill rate of a top load washer. The overall fill time is increased. The concentration of ozone is reduced, reducing the effectiveness of the ozonization during the actual agitation portion of a washing machine cycle.

In water treatment apparatus available to the prior invention, different models were available. A customer selected one model or the other depending on the type of washing machine.

Addressing this particular problem in a different way, the illustrated embodiment of the invention employs the first and the second water aspirators 60 and 80, including respective first and second Venturi tubes 62 and 82, which are designed for different flow rates. By way of example and not limitation, the first water aspirator 60 and Venturi tube 62 are designed for a relatively higher water flow rate of 2.3 gallons per minute. By way of example and not limitation, the second water aspirator 80 and Venturi tube 82 are designed for a relatively lower water flow rate of 1.3 gallons per minute. 2.3 gallons per minute is slightly less than the typical water fill rate of a top load washer, and 1.3 gallons per minute is slightly less than the typical water fill rate of a front load washer.

Downstream of the water aspirators 60 and 80 is an outlet manifold 120 having two inlets 122 and 124 connected to the two Venturi tube outlet ports 70 and 90, respectively. The outlet manifold 120 has a manifold outlet 126 which is connected to a mixer, generally designated 130. The mixer 130 accordingly is downstream of the two water aspirators 60 and 80. The outlet manifold 120 is a molded plastic piece, and has a capped extension 128, which is an artifact of the molding process.

In the illustrated embodiment, the mixer 130 includes a mixer input port 132 connected to the manifold outlet 126, as well as a mixer output port 134. The mixer 130 more particularly takes the form of a transparent outer tube 136 and a spiraled inner chamber 138 defined by a stationary helix 140. Within the mixer 130, gas (a mixture of air and ozone) is mixed and at least partially dissolved in water flowing through the apparatus 20 and being treated. During normal operation, bubbles are visible within the mixer 130 through the transparent tube 136.

Figure 4:
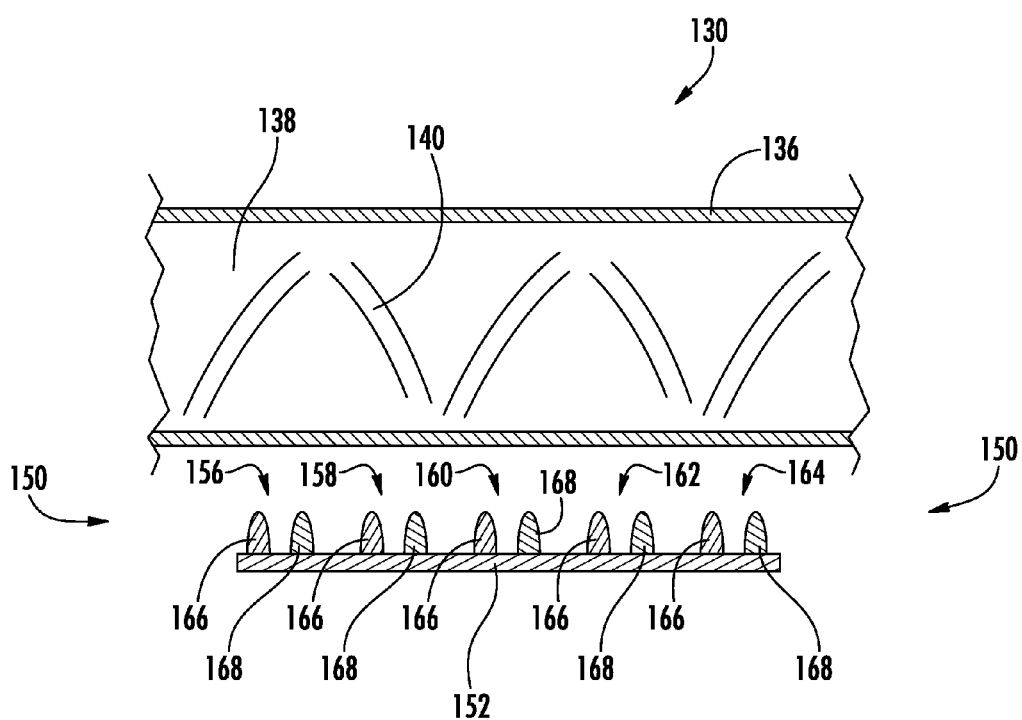
FIG. 4 is a view taken on line 4-4 of FIG. 2, showing LEDs which illuminate a mixer within the water treatment apparatus.
Figure 5:
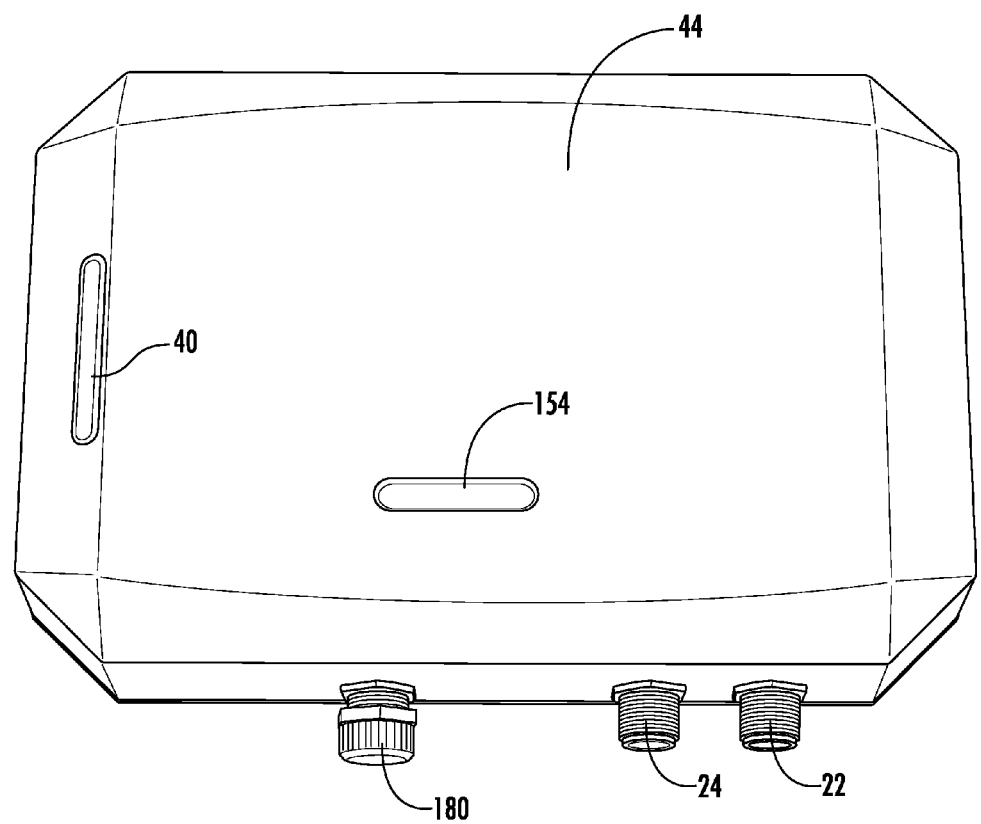
FIG. 5 is a three-dimensional top view of the water treatment apparatus showing a window through the mixer is observed, as well as LED color.

Referring briefly to FIG. 4, to facilitate viewing of bubbles within the mixer 130, illumination is provided, as well as operational status of the apparatus 20 indicated, by a set of LEDs 150, supported on a circuit board 152 mounted underneath the transparent outer tube 136. Referring to FIG. 5, in addition to FIG. 4, a window 154 is provided in the top cover 44 for viewing the status LEDs 150, as well as the bubbles within the mixer 130.

The LEDs 150 more particularly are organized as five LED pairs 156, 158, 160, 162 and 164. Each of the pairs includes a blue LED 166 and a red LED 168. As described in greater detail hereinbelow, the blue LEDs 166 are energized to indicate normal operation, and the red LEDs 168 are energized to indicate a fault condition.

Referring again to FIGS. 1 and 2, connected to the mixer output port 134 is an input port 170 of a discharge manifold 172. The discharge manifold 172 has two output ports 174 and 176.

The output port 174 is the main output port, and corresponds to the water outlet 24 of the water treatment apparatus 20, which water outlet 24 may be viewed as the main water outlet. The outlet port 176 corresponds to a secondary water outlet 178, which has a cap 180. The secondary water outlet 178 is provided in the event the water treatment apparatus 20 is to be used to provide ozonated water to something other than a washing machine connected to the main water outlet 24. The water inlet 22, the main water outlet 24, and the secondary water outlet 178 all have threaded hose connections for apparatus 20 intended to be sold in the United States.

For selectively directing water from the water inlet 22 to the water outlet 24, a single two-position valve 190 having three ports is provided. With reference to the rear view of FIG. 6, the valve 190 is operated via a slotted actuator 192 during initial setup employing, for example, an ordinary screwdriver.

In the illustrated embodiment, the valve 190 is connected to the input end of the water aspirators 60 and 80. In other words, the valve 190 selectively connects the water inlet 22 two either the water inlet port 64 of the first Venturi tube 62 or the water inlet port 84 of the second Venturi tube 82. More particularly, the valve 190 has an inlet port 194 connected to and supplied with water via the water inlet tube 26, a first outlet port 196 connected to the water inlet port 84 of the second Venturi tube 82 via a coupler 198, and a second outlet port 200 connected via a coupler 202 to a "U" tube 204. The "U" tube 204 is in turn connected via a coupler 206 to the water inlet port 64 of the first Venturi tube 62. The "U" tube 204 is a molded plastic piece and, like the discharge manifold 172, has a capped extension 208 which is an artifact of the molding process.

It will, however, be appreciated that the function of selectively directing water from the water inlet 22 to the water outlet 24 through either of the water aspirators 60 and 80 can as well be accomplished by providing a valve (not shown) at the outlet ends of the two Venturi tubes 62 and 80, and providing a simple manifold (not shown) at the input of the two Venturi tubes 62 and 82.

In any event, during initial installation of the water treatment apparatus 20, the valve 190 is set, employing the slotted actuator 192 (FIG. 6), to direct water through either the first water aspirator 60 and Venturi tube 62, or the second water aspirator 80 and Venturi tube 82, depending upon the type of washing machine connected or to be connected to draw water from the water outlet 24. Again, in the case of a top load washer, which has a relatively higher water fill rate, the valve 190 is set to direct water flow through the first water aspirator 60 and Venturi tube 62 ("TOP LOAD" position). In the case of a front load washer, having a relatively lower water fill rate, the valve 190 is set to direct water through the second water aspirator 80 and the second Venturi tube 82 ("FRONT LOAD" position).

Figure 6:
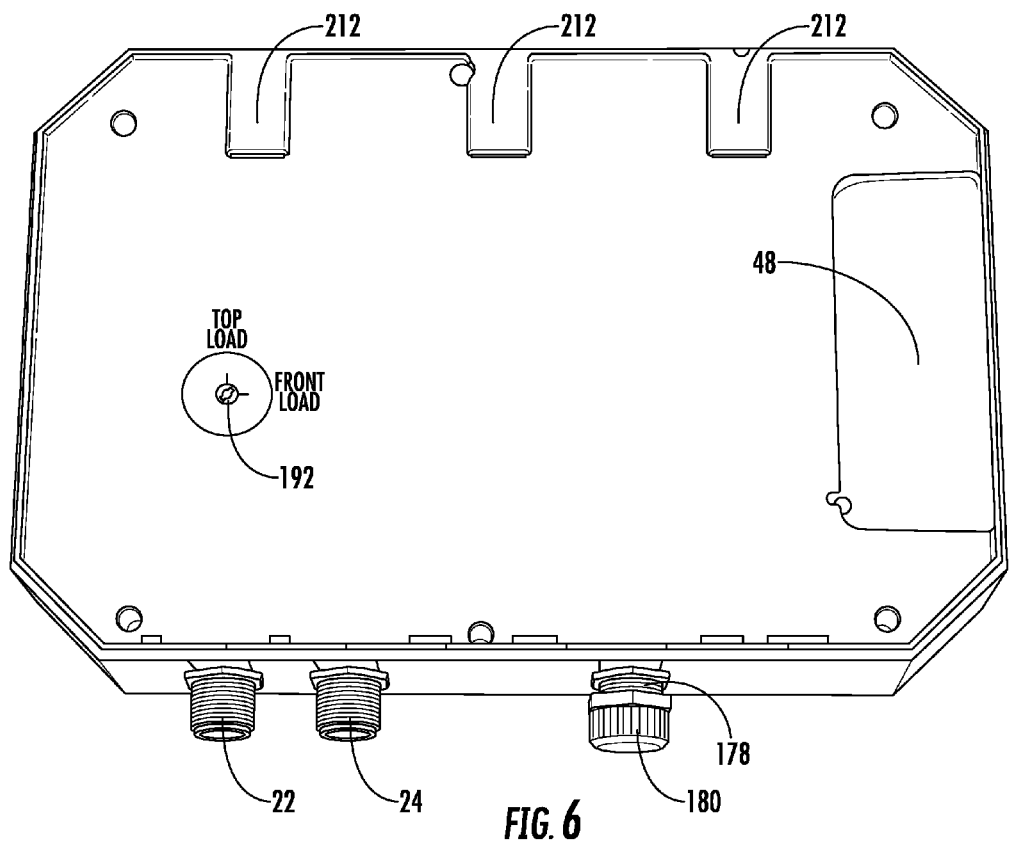
FIG. 6 is a three-dimensional rear view of the water treatment apparatus, showing a control for a two-position valve employed during initial setup of the apparatus.

Also visible in FIG. 6 are the underside of the cavity body 48 of the air dryer 36, as well as three hanger slots 212.

In addition to the primary functional components described hereinabove, several additional components are shown in FIGS. 1 and 2.

For additional water conditioning, a magnetic water ionizer/descaler 210 is connected to the water inlet tube 26, immediately downstream of the water inlet 24. A controller, generally designated 214, controls the ozone generator 30, as well as the blue and red LEDs 166 and 168. The controller 214, in the illustrated embodiment, operates from 12 Volts DC, provided by an external power supply (not shown) connected via a power input connector 216 (FIG. 2).

Figure 7:
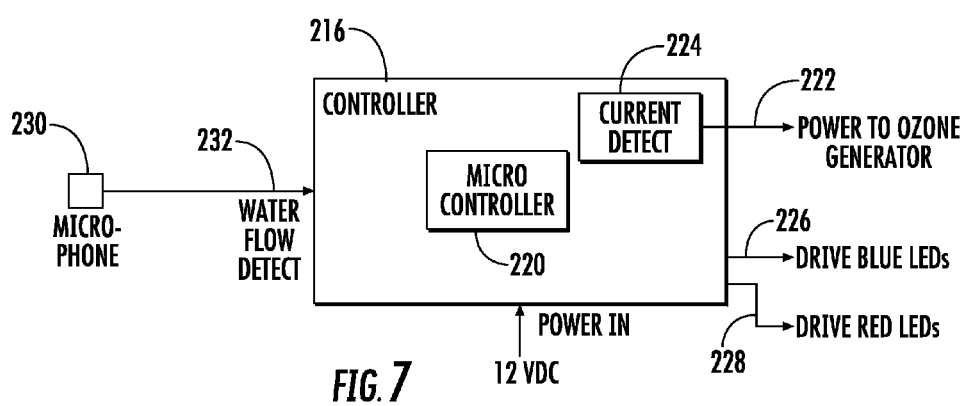
FIG. 7 is a highly schematic representation of a controller, which in turn includes a microcontroller, within the water treatment apparatus of FIGS. 1 and 2.

Referring now to FIG. 7, the controller 214 is supplied with 12 Volt D.C. power, and includes a printed circuit board (not shown) supporting a microcontroller 220. The microcontroller 220 is programmed to effect various control functions, including functions represented by an "Ozone Generator Control Routine" represented by the flowchart of FIG. 8, and a "Failure Detect Routine" represented in the flowchart of FIG. 9. The controller 214 in general, and the microcontroller 220 in particular, control D.C. power provided to the ozone generator 30 via an output 222. (The ozone generator 30 includes a conventional high voltage generator (not shown) which operates from 12 Volts D.C.) A current detector 224 measures current drawn by the ozone generator 30. The controller 214 also includes outputs 226 and 228 for driving the BLUE 166 and RED 168 LEDs, respectively.

An aspect of the disclosed embodiment is the manner in which water flow is detected. In general (but with an exception described hereinbelow with reference to FIG. 8), the ozone generator 30 is not supplied with power unless the washing machine is drawing water through the water outlet 24. At other times, and in general, the ozone generator 30 is not energized.

Water flow is detected employing a microphone 230, and associated control routines within the microcontroller 220, which recognize a characteristic sound when water is being drawn and either of the two Venturi tubes 62 or 82 is operating. In the disclosed embodiment, a relatively simple approach is employed: When a sound having a frequency over 10 Hz is detected, it is assumed that one of the Venturi tubes 62 or 82 is operating A suitable microphone 230 is a Panasonic Model WM-60A electret condenser microphone.

To avoid possible corrosive effects of ozonated water, the microphone at 230 is connected to the inlet air conduit 42. Although this particular location is somewhat removed from the Venturi tubes 62 and 82, the characteristic sound travels through the apparatus 26, in particular through the air outlet conduit 34 and the ozone generator 30, and effectively reaches the microphone 230.

Microphone 230 output is connected to a water flow detect input 232 of the controller 214, and thereby to the microcontroller 220.

Another aspect of the disclosed embodiment addresses the situation whereby, in many washing machines, at particular times during a washing machine cycle, water flow is pulsed ON and OFF briefly, for example five, ten or fifteen seconds at a time. Under such conditions, it is preferable for the ozone generator 30 to operate continuously, rather than for brief intervals. Thus, when the water stops flowing, the microcontroller 230 implements a timer, which allows the ozone generator 30 to remain powered ON for one minute, for example, before turning OFF.

There are two reasons for this. One reason is that ozone generation is not immediate; it may take several seconds for ozone to be generated after the ozone generator 30 is powered ON. Another reason is that the life of the ozone generator 30 is extended if the ozone generator 30 is allowed to operate continuously during such periods when water is drawn intermittently by the washing machine in a pulsed manner.

Figure 8:
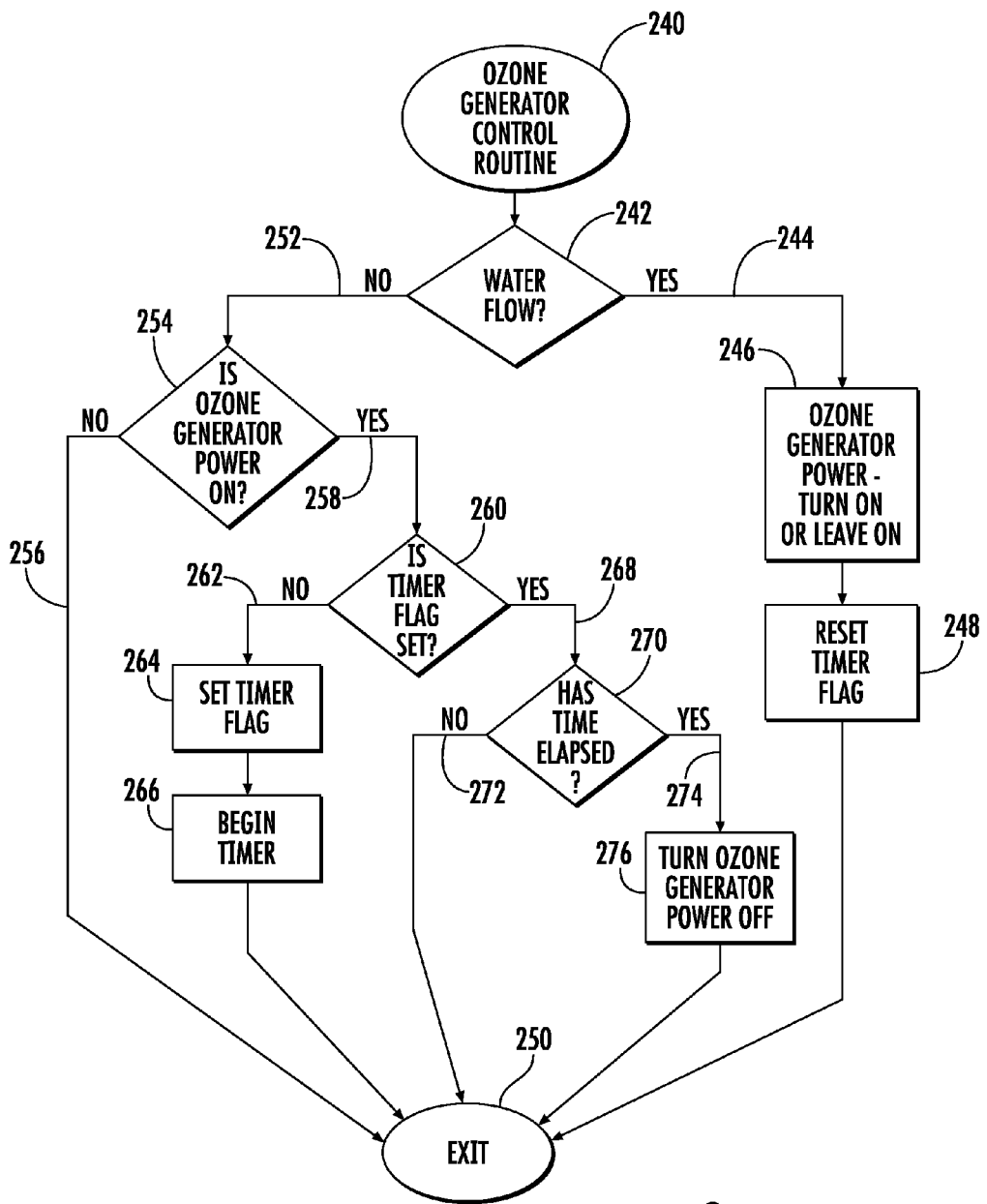
FIG. 8 is a flow chart of an "Ozone Generator Control Routine" that runs within the microcontroller.

Accordingly, and with particular reference to the Ozone Generator Control Routine 240 of FIG. 8, decision box 242 determines whether water is flowing, again, via the detection (or not) of the characteristic sound of a Venturi tube operating. If water is flowing, then YES decision branch 244 is taken.

In box 246, power to the ozone generator 30 is turned ON or, if already ON, is left ON. In box 248, a TIMER FLAG is RESET. Thus, during portions of a washing machine cycle when water is drawn in intermittent pluses, the exemplary one-minute timer is reset each time water is drawn. The routine then exits at 250.

If water is not flowing, then NO branch 252 is taken from decision box 242.

Then, in decision box 254, it is determined whether the ozone generator 30 is powered. If not, then NO branch 256 is taken, to exit at 250. If the ozone generator power is ON, then YES branch 258 is taken. Decision box 260 then determines whether the TIMER FLAG is SET. If not, meaning water has just stopped being drawn from the outlet 24, NO branch 262 is taken. In box 264, the TIMER FLAG is SET. In box 266 a timer is started, by way of example, a one-minute timer. The routine then exits at 250.

If in decision box 260 it is determined that the TIMER FLAG is already SET, meaning water has recently stopped being drawn from the outlet 24 ("recently" meaning less than one minute prior), then YES branch 268 is taken.

Another decision box 270 then checks the timer to determine whether the exemplary one-minute time has elapsed. If not, then NO branch 272 is taken, and the routine then exits at 250.

If the exemplary one-minute time has elapsed, then YES branch 274 is taken. In box 276, power to the ozone generator 30 is turned OFF. The routine then exits at 250.

As another aspect of the disclosed embodiment, the current detector 224 is employed to determine whether the ozone generator 30 is operating properly. During normal operation, current drawn by the ozone generator 30 is within the approximate range 0.8 amperes to 2.0 amperes. If current drawn by the ozone generator 30 is above a predetermined maximum value, for example above 2.0 amperes, or below a predetermined minimum value, for example below 0.8 amperes, such indicates that the ozone generator 30 has failed.

If the ozone generator is operating normally (regardless of whether water is currently flowing), then normal operation is indicated, and the blue LEDs 166 are operated. If, on the other hand, current drawn by the ozone generator is above the predetermined maximum value (2.0 amperes in the illustrated embodiment) or below the predetermined maximum value (0.8 amperes in the illustrated embodiment), then the red LEDs 168 are operated, indicating to a customer that a failure has occurred. To particularly draw attention, the red LEDs 168 may be operated in a flashing manner.

Figure 9:
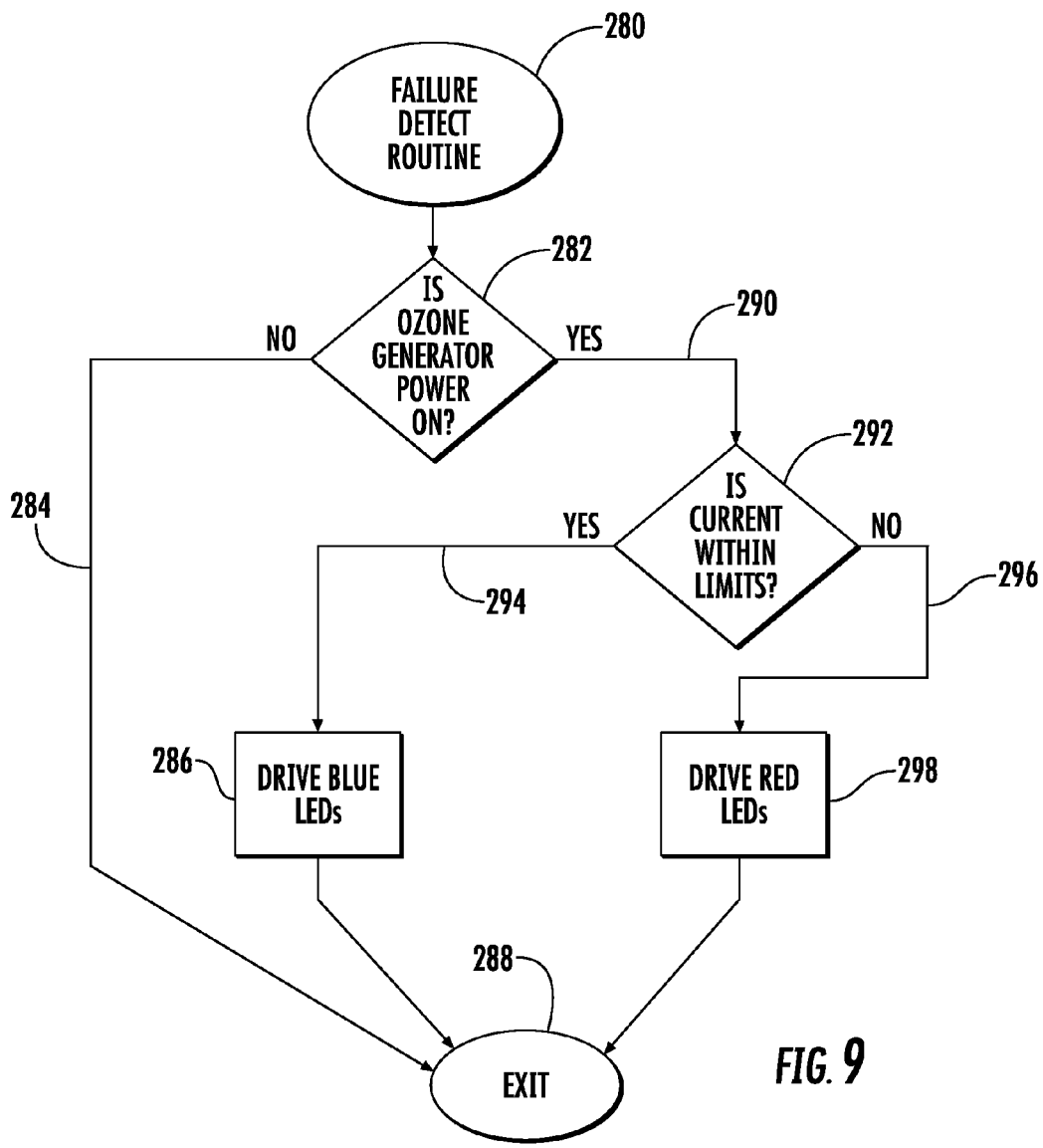
FIG. 9 is a flowchart of a "Failure Detect Routine" that also runs within the microcontroller.

With particular reference to an ozone generator Failure Detect Routine 280 of FIG. 9, in decision box 282 it is determined whether the ozone generator 30 is powered ON. If not, then NO branch 284 is taken, and the routine exits at 288.

If in decision box 282 it is determined that the ozone generator 30 is powered ON, then YES branch 290 is taken, and execution passes to decision box 292. If in decision box 292 it is determined that current, as detected by the current detector 224 is within the predetermined limits, then YES branch 294 is taken, to box 286, where the BLUE LEDs 166 are driven.

If, on the other hand, in decision box 292 is it is determined that current is not within limits, then NO branch 296 is taken. In box 298 the RED LEDs 168 are driven. To particularly draw attention, the red LEDs 168 may be driven to flash. The routine then exits at 288.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Water treatment apparatus comprising:
a water inlet;
a water outlet;
first and second water aspirators including respective first and second Venturi tubes through which water can flow, each of said Venturi tubes having a water inlet port, a water outlet port, and a vacuum port, said first Venturi tube being designed for a relatively higher water flow rate and said second Venturi tube being designed for a relatively lower water flow rate, the two Venturi tubes having different minimum water flow rate thresholds, below which the respective Venturi tube will not function;
a single three-port valve having two positions for selectively directing water from said water inlet to said water outlet through either said first or said second water aspirator; and
an ozone generator having an output connected to said vacuum ports, whereby gas including ozone is drawn either into water flowing through said first Venturi tube or water flowing through said second Venturi tube, depending on the position of said valve.

2. The water treatment apparatus of claim 1, wherein said valve selectively connects said water inlet to said water inlet port of either said first or said second water aspirator.

3. The water treatment apparatus of claim 1, which further comprises a mixer downstream of said water aspirators for facilitating the dissolving of ozone into water which has flowed through said first Venturi tube or water which has flowed through said second Venturi tube, depending on the position of said valve.

4. The water treatment apparatus of claim 1, which further comprises a water flow sensor connected to a controller for activating said ozone generator when water is drawn out of said water outlet and thereby through either said first or said second water aspirator.

5. The water treatment apparatus of claim 4, wherein said water flow sensor includes a microphone physically connected for sensing a sound characteristic of operation of a Venturi tube.

6. The water treatment apparatus of claim 4, wherein said controller effects a time delay for maintaining activation of said ozone generator for a predetermined time duration even after water flow as sensed by said water flow sensor has ceased, whereby said ozone generator operates continuously when water is intermittently drawn out of said water outlet.

* * * * *